(12) United States Patent
Okada et al.

(10) Patent No.: US 7,115,233 B2
(45) Date of Patent: Oct. 3, 2006

(54) REFORMER

(75) Inventors: Tatsunori Okada, Tokyo (JP); Kenji Kawaguchi, Tokyo (JP); Hideo Ichimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 515 days.

(21) Appl. No.: 10/290,289

(22) Filed: Nov. 8, 2002

(65) Prior Publication Data

US 2003/0101650 A1    Jun. 5, 2003

(30) Foreign Application Priority Data

Nov. 22, 2001    (JP) ............................. 2001-357939

(51) Int. Cl.
- *B01J 7/00* (2006.01)
- *B01J 10/00* (2006.01)
- *B22B 5/02* (2006.01)
- *B23P 11/00* (2006.01)
- *B23K 1/00* (2006.01)

(52) U.S. Cl. .......................... 422/129; 422/146; 48/61; 29/509; 228/60; 228/141; 228/17

(58) Field of Classification Search ............ 228/124.6, 228/137, 144, 262.45; 29/509, 506, 510, 29/511; 422/146

See application file for complete search history.

(56) References Cited

U.S. PATENT DOCUMENTS

| | | | | |
|---|---|---|---|---|
| 3,078,551 A | * | 2/1963 | Patriarca et. al. | 29/890.043 |
| 4,443,228 A | * | 4/1984 | Schlinger | 48/86 R |
| 5,242,254 A | * | 9/1993 | Harold | 413/21 |
| 5,285,916 A | | 2/1994 | Ross | |
| 5,733,675 A | | 3/1998 | Dederer et al. | |
| 5,945,192 A | | 8/1999 | Kato et al. | |
| 2002/0106539 A1 | * | 8/2002 | Chong et al. | 429/19 |

* cited by examiner

*Primary Examiner*—Alexa D. Neckel
*Assistant Examiner*—Kaity Handal
(74) *Attorney, Agent, or Firm*—Leydig, Voit & Mayer, Ltd.

(57) ABSTRACT

A reformer that includes a housing including a tubular member and an end plate member hermetically joined to the tubular member. The housing defines within it a first fluid flow path and a second fluid flow path in a heat exchanging relationship with each other. A reforming catalyst is disposed within the first fluid flow path. The tubular member has a tubular end, and the end plate member has an abutting rim that contacts with and extends along the tubular end of the tubular member and that is folded together over an entire circumference thereof to define a folded hermetic seam between the tubular member and the end plate member. The reformer can be low-priced and its manufacture is easy and efficient.

16 Claims, 8 Drawing Sheets

REFORMER

BACKGROUND OF THE INVENTION

1. Field of the Invention

This invention relates to a reformer, a CO shift reactor, a CO reducer, a CO oxidizer, a CO methanation reaction vessel, and the like, used in fuel cells and other uses (hereinafter referred to as a reformer, collectively) and, in particular, to the structures of seams of the reformer, wherein tubular members compose an outer vessel of the reformer, various kinds of internal vessels are disposed within the outer vessel, and flow paths for various kinds of fluids, are united, gas-tight, with plate members that are abutted on the tubular members at their internal surfaces, external surfaces, or both the internal and external surfaces.

2. Description of the Related Art

Seams in a conventional reformer are described in the following taking the generator-type reformer (a reformer in a narrow sense) disclosed in Japanese Patent Laid-Open No. 1995-257901 as an example while referring to FIG. 11. FIG. 11 is a longitudinal sectional view of a heat-exchanging-type reformer.

In FIG. 11, the reformer comprises a gas-tight outer vessel composed of a bottomed outer cylindrical casing 1A as a tubular member and two end plates 1B as plate members closing both ends of the outer cylindrical casing 1A, or both the upper and lower open ends thereof. Fluid flow paths are formed by various tubes, as additional tubular members, and plate members and the like as the tube plates (partition walls) to be united with these tubes at their ends and are disposed within the outer vessel.

FIG. 2 illustrates a first fluid feeding pipe that introduces the material fluid, a first fluid, into the outer vessels (1A, 1B). 3 is a first fluid inlet manifold, and 4 is a first fluid flow path through which the first fluid flows after being introduced through the first fluid inlet manifold 3.

Each first fluid flow path 4 is of a double-tubular structure consisting of a bottomed tubular member, an outer tube 5, and an inner tube 6 contained in the outer tube 5 coaxially as a tubular member with both ends open.

7 in the Figure is a flow path for a second fluid, through which the second fluid from a second fluid feeding pipe 7A passes, while exchanging heat with the first fluid via the double tubes (the outer tube 5 and the inner tube 6) composing the first fluid flow path 4 until it is discharged from a second fluid discharge pipe 7B.

The second fluid flow path 7 is separated from the first fluid inlet manifold 3 by a first end plate 8 as a plate member. Similarly, the first fluid inlet manifold 3 is separated from a first fluid outlet manifold 9 by a second end plate 10 as a plate member separate from the one described above.

By the way, 11 is a bellows connecting the second end plate 4 and the inner tube 6. 12 is a reforming medium and 13 is a first fluid discharge pipe.

The operation of the reformer is now described briefly in the following.

The first fluid introduced from the first fluid feeding pipe 2 into the first fluid inlet manifold 3 within the outer cylindrical casing 1A flows into the first fluid exit manifold 9 after passing through a ring-shaped space formed between the outer tube 6 and the inner tube 5, or the first fluid flow path 4, 4, 4. The reforming medium 12 causing the first fluid as the material fluid to react to reformation is filled in a portion of the first fluid flow path 4, 4, 4, and the first fluid is shifted there to a reformed gas by the reforming medium 12.

The reformed gas thus obtained is sent to the first fluid exit manifold 9 through the inner tube 4 and then fed to fuel cells (not shown) via the first fluid discharge pipe 13.

From the second fluid feeding pipe 7A formed near the bottom of the outer cylindrical casing 1A, a high-temperature combustion gas, the second fluid, is sent out and introduced into the second fluid flow path 7. The combustion gas passes through the outer tube 5 while providing heat via the outer tube 5 to the reforming medium 12 contained therein, or heating the reforming medium 12 from outside, and is discharged from the second fluid discharge pipe 7B.

In the reformer, each seam uniting the first end plate 8 with the outer tube 6, or the second end plate 10 with the inner tube 5 (the seam formed via the bellows 11, in this instance) is formed gas-tight with welding so that the first fluid will not mix with the second fluid. Needless to say, the outer cylindrical casing 1A composing the outer vessel and the covering 1B are welded similarly.

In conventional reformers, every seam uniting tubular members including the inner tube 5, the outer tube 6 and the outer cylindrical casing 1A with plate members abutted on these tubular members including the end plates 8 and 10 and the covering 1B is formed with welding for preventing different fluids mixing, while attaining the formation of fluid leakage-free fluid flow paths.

Conventional reformers of a laminar type, for example, are reported on page 79 and page 202 of the proceedings of the third international fuel cell congress held in Nagoya Congress Center between the 30th Nov. and the 3rd Dec., 1999 under the co-sponsorship of the New Energy and Development Organization (NEDO) and the Fuel Cell Development Information Center.

However, it is difficult to apply automatic welding to the sections where tubular members and board members are welded because such sections include many relatively steep curves, as can be seen from the reformer shown in FIG. 11, thus making it unavoidable to rely on expert workers' manual welding, while making an automatic fabrication or a mass production of reformers and a reduction in the manufacturing cost difficult to attain.

Further, seams formed with welding have an additional problem in that the precision of fabrication is impaired due to the occurrence of weld strains at welded sections.

SUMMARY OF THE INVENTION

The present invention has as its object to provide a low-priced reformer free from such problems, in which it is possible to form highly precise and gas-tight seams suffering from no weld strains by automatic joining.

With the above object in view, the present invention resides in a reformer that includes a housing including a tubular member and an end plate member hermetically joined to the tubular member. The housing defines within it a first fluid flow path and a second fluid flow path in a heat exchanging relationship with each other. A reforming catalyst is disposed within the first fluid flow path. The tubular member has a tubular end, and the end plate member has an abutting rim that contacts with and extends along the tubular end of the tubular member and that is folded together over an entire circumference thereof to define a folded hermetic seam between the tubular member and the end plate member.

Accordingly, it is possible to provide low-priced reformers,and the uniting work can be performed efficiently.

Also, a reformer has everywhere seams uniting gas-tight a tubular member with a plate member, all or a part of the seams are formed by folding together a cylindrical end of the tubular member and an abutting rim of the plate member being overlapped at least in part with the cylindrical end in an overlapped state throughout the entire distance of the surrounding edge.

Further, the reformer of the present invention has seams uniting each tubular member composing a multiple tube including two or more tubes being disposed coaxially with a plate member, all or a part of the seams are formed by folding together a cylindrical end of the tubular member and an abutting rim of the plate member being overlapped at least in part with the cylindrical end in an overlapped state throughout the entire distance of the surrounding edge.

DESCRIPTION OF PREFERRED EMBODIMENTS

Embodiment 1

Figure 1:
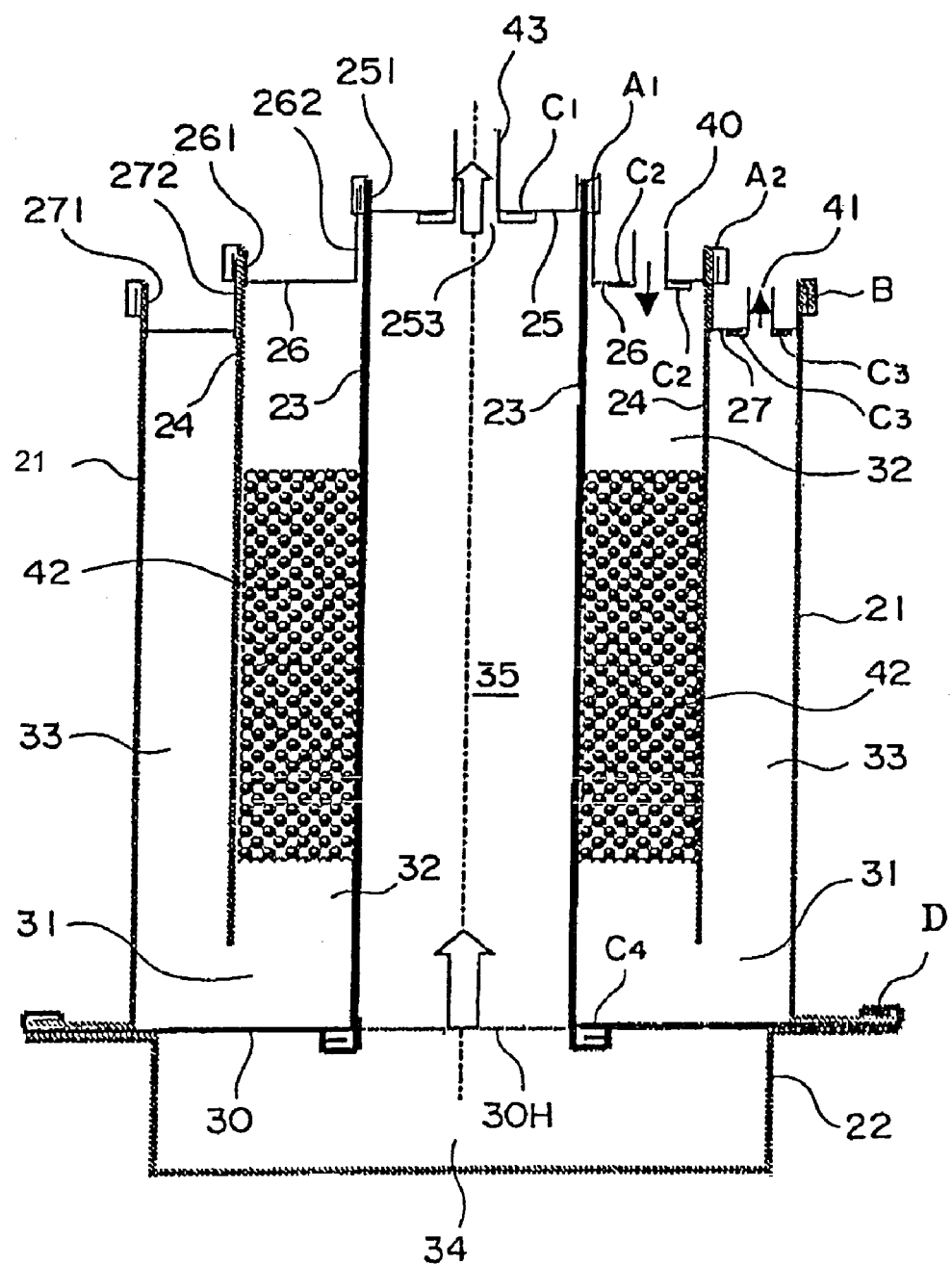
FIG. 1 is a longitudinal sectional view of a reformer of Embodiment 1 of the present invention.

Embodiment 1 of the invention is now described taking an inner flame-type reformer for fuel cells as an example while referring to FIG. 1. FIG. 1 is a longitudinal sectional view of a reformer of the invention.

In FIG. 1, an outer vessel of a reformer 20 is composed by an outer cylindrical casing 21 as a tubular member, an end plate 22 as a plate member closing the lower open end (bottom) of the outer cylindrical casing 21 and an end plate closing the upper open end side. A description of the end plate closing the upper open end will be given later.

An inner tube 23 and a middle tube 24 as tubular members are disposed coaxially in the inside of the bottomed cylinder as the outer vessel composed by the outer cylindrical casing 21 and the end plate 22, giving a triplicate tubular structure having the outer cylindrical casing 21 as the outermost tube.

An inner end plate 25 as a plate member formed in disc for closing the open end of the inner tube 23 is fitted with the upper open end of the inner tube 23 axially from the open end of the inner tube 23.

An inner ring-shaped end plate 26, as a plate member formed in ring for closing the upper open end of the ring-shaped space formed between the inner tube 23 and the middle tube 24, is fitted with the open end of the ring-shaped space axially from the open end of the ring-shaped space.

Further, an outer ring-shaped end plate 27, as a plate member formed in ring for closing the upper open end of the ring-shaped space formed between the middle tube 24 and an outer tube, or the outer cylindrical casing 21, is fitted similarly with the open end of the ring-shaped space axially.

The upper open end of the outer cylindrical casing 21 is closed by the end plates as plate members, or the inner end plate 25, the inner ring-shaped end plate 26 and the outer ring-shaped end plate 27.

Formed in advance along the edge of each of these end plates (the inner end plate 25, the inner ring-shaped end plate 26 and the outer ring-shaped end plate 27), or the inner and outer surrounding edges of the end plates in this instance, is an inner or outer abutting rim as an abutting rim to be disposed along the surrounding surfaces, or the marginal section in band of each of the tubular members (the inner tube 23, the middle tube 24 and the outer tube 21) from the open end down axially to a depth to be folded by the folding process (described later) with the abutting rim (hereinafter, the "cylindrical end"), of each tubular member in a way in which at least a part thereof is overlapped with the cylindrical end, and the abutting rim is formed by folding the edge of each end plates to one direction throughout the entire distance of the edge.

In FIG. 1, an outer abutting rim 251 abutting on the inner surface of the inner tube 23 is formed for the inner end plate 25. An outer abutting rim 261 abutting on the inner surface of the middle tube 24 plus an inner abutting rim 262 abutting on the outer surface of the inner tube 23 are formed for the inner ring-shaped end plate 26. An outer abutting rim 271 abutting on the inner surface of the outer tube 21 and the inner abutting rim 272 abutting on the outer surface of the middle tube 24 are formed for the outer ring-shaped end plate 27.

The abutting rims 251, 261, 262, 271 and 272 are formed in advance into rims each having a breadth covering a length in line with the axis from the position where each of the end plates 25, 26 and 27 is fitted in (the position on which each end plate abut the appropriate tubular member) at least to the upper open end of the inner tube 23, middle tube 24 or the outer tube 21 on which it abuts. Of the abutting rims 251, 261, 262, 271 and 272, those that are to come to the surfaces of the seams formed by folding (described later) to cover the surfaces of such seams (in this instance, the abutting rims 251, 261 and 271 coming to the surface of the seams as they are folded to the outside of each tubular member) are formed into rims having a covering extended section in cylindrical form of a breadth that well exceeds the breadth of cylindrical end of the inner tube 23, the middle tube 24 or the outer tube 21 on which they are abutted, so that the section extends beyond the cylindrical ends of the tubular members.

Whereas, the abutting rims 262 and 272 that are formed by folding to the inside are formed into rims of a breadth similar to the breadth of the cylindrical end of the inner tube 23 and the middle tube 24 on which they are abutted.

The abutting rims 251, 261, 262, 271 and 272 of the end plates 25, 26 and 27 being fitted in at their respective prescribed abutting positions are folded to the inside or the outside of the tubular members together with the cylindrical ends of the inner tube 23, the middle tube 24 and the outer tube 21 in an overlapped state or independently in a way in which the rims enclose at least the cylindrical end of each of the tubular members while the covering extended sections thereof come to the surface of the seams. Such folding works are performed via caulking, rolling-compacting, curling or other bending-up means to form gas-tight seams.

Figure 2:
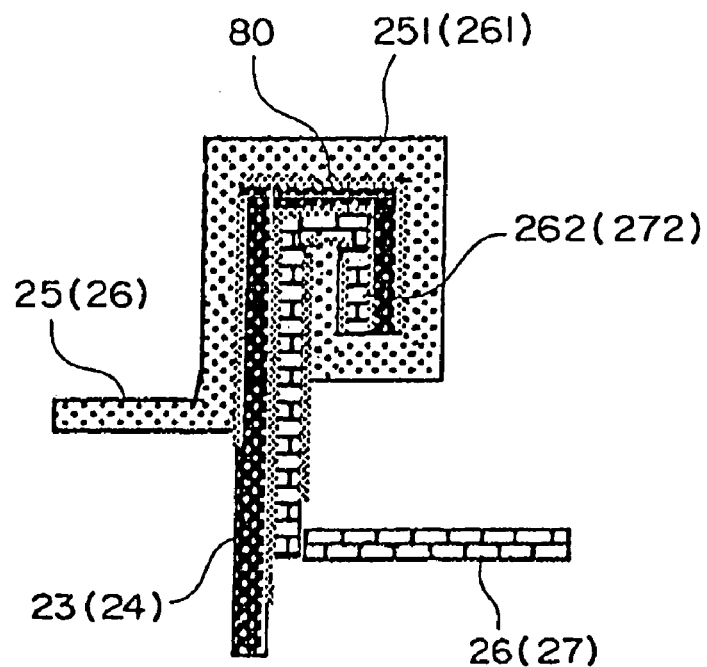
FIG. 2 is an enlarged sectional view of Type A seam.

FIG. 2 is a sectional view of a seam formed with the rolling-compacting process at the cylindrical end of the inner tube 23 (hereinafter, the "Type A seam"), and the seam at the cylindrical end of the middle tube 24 is also of the type.

In the Figure, at the cylindrical end of the inner tube 23 (the middle tube 24), the outer abutting rim 251 (the outer abutting rim 261) of the inner end plate 25 (the inner ring-shaped end plate 26) abutting on the inner surface of the inner tube 23 (the middle tube 24) is extended to give, at the tip thereof, a covering extended section having a length well exceeding the axial length (breadth) of the cylindrical end of the inner tube 23 (the middle tube 24), and the extended section is folded with the cylindrical rim and the inner abutting rim 262 (described later) (the inner abutting rim 272) in a state of triplicate overlapping toward the outside of the inner tube 23 (the middle tube 24) and then rolled up inside the tip, or a cylindrical rim being formed by folding the tip of the covering extended section, of the outer abutting rim 251 (the outer abutting rim 261).

In this instance, the inner abutting rim 262 (the inner abutting rim 272) of the inner ring-shaped end plate 26 being abutted on the outer surface of the inner tube 23 (the middle tube 24) is formed into a rim having a length almost same as that of the length (breadth) of the cylindrical rim, and because it is folded with the folded cylindrical rim in an overlapped state to form a seam, it comes to the surface of the seam in which the outer abutting rim 251 (the outer abutting rim 261) and the covering extended section thereof are enclosed therein. The tip of the covering extending section is rolled up in the inside of the folded inner abutting rim 262 (the inner abutting rim 272).

Figure 3:
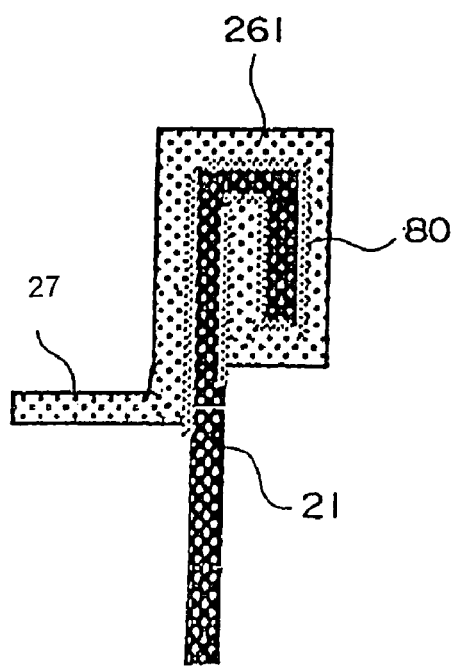
FIG. 3 is an enlarged sectional view of Type B seam.

FIG. 3 is a sectional view of a seam formed by the rolling-compacting process at the cylindrical end of the outer tube 21 as an outer cylindrical casing (hereinafter, the "Type B seam").

In the Figure, at the cylindrical end of the outer tube 21, the outer abutting rim 261 of the outer end plate 26 abutting on the inner surface of the outer tube 21 is extended to give a covering extended section having a length well exceeding the axial length (breadth) of the cylindrical end of the outer tube 21, and the extended section is folded with the cylindrical rim in a state of duplicate overlapping toward the outside of the outer tube 21 to come to the surface of the seam and also to be rolled up inside the tip, or a cylindrical rim being formed by folding the tip of the covering extended section, of the outer abutting rim 261.

In FIGS. 2 and 3, although the end plates 24 and 25 as plate members and the cylindrical ends of the tubular members 23 and 21 are subjected to the rolling-compacting process in a state of duplicate or triplicate overlapping, the process may be substituted appropriately by any one of the processing means including caulking that is simpler and involves a lesser extent of rolling than rolling-compacting and curling involving a larger extent of rolling than rolling-compacting, depending on the individual environment of each seam. For forming gas-tight seams, rolling-compacting is superior to a simple caulking process, although curling is best.

In Embodiment 1, seams are formed by inserting a sealing member 80 in the space between the cylindrical ends of tubular members and the abutting rims to be abutted on the cylindrical ends prior to folding for the purpose of attaining a further gas-tightness at seams.

The materials recommendable for use as such a sealing member, such as the sealing member 80, include, for instance, a thin film of organic materials such as tetrafluoroethylene, silicone, and polyether ketone, a paste or a thin film of either organic or inorganic materials, and a thin film of brazing materials, such as silver, copper, and nickel, and fine powders of brazing materials. When forming a sealing layer using any brazing material, the material is inserted in the seam, folded, and then melted by heat treatment. Needless to say, it is preferable to insert the sealing member 80 similarly when forming seams with caulking or curling.

As shown in FIG. 1, seams A1, A2 and B uniting the cylindrical ends of the tubular members 23, 24 and 21 composing a multiple tube with the abutting rims of the end plates 25, 26 and 27 are formed at positions shifted axially in relation to the heights of the neighboring tubular members 23, 24 and 21 to avoid the same positioning in line with the axis.

The formation of the seams A1, A2 and B at the shifted positions in this way allows a smooth performance free from a mutual disturbance among neighbouring seams A1, A2 and B and interference from work jigs (not shown) in conducting the uniting work of the end plates 23, 24 and 25 in the multiple tube.

In the illustrated example, the positions of the seams A1, A2 and B of the tubular members 23, 24 and 21 are shifted axially (downward in the Figure) in the order of the radial distance from the axis to the positions where the tubular members are; the inner tube 23 shortest, the outer tube 21 longest and the middle tube 24 middle.

In FIG. 1, 30 is an end plate as a plate member formed in ring. The end plate 30 closes the lower open end of a ring-shaped space between the inner tube 23 and the outer tube 21 as an outer cylindrical casing, and a first fluid flow path through which the material fluid passes is formed as a serial fluid path by communicating an inner ring-shaped space 32 between the inner tube 23 and the middle tube 24 with an outer ring-shaped space 33 between the middle tube 24 and an outer tube 21 via an intervening flow space 31 being formed between the end plate 30 and the middle tube 24 giving a void below as it is shorter than the inner and outer tubes.

A combustion gas flow path through which a combustion gas as a second fluid flows is formed as a second fluid flow path by communicating a bottom space 34 formed between the end plate 30 and an end plate 22 with an axial space 35 in line with the axis of the inner tube 23 via a central opening 30H of the end plate 30.

A first fluid introducing pipe tube 40 for introducing the first fluid is united at appropriate positions with a ring-shaped end plate 26 closing the upper open end of the inner ring-shaped space 32 between the inner tube 23 and the middle tube 24 (seam C2), while a first fluid discharge pipe 41 for discharging the reformed first fluid is united (seam C3) with a ring-shaped end plate 27 closing the upper open end of the outer ring-shaped space 33 between the middle tube 24 and the outer tube 21.

Reforming of the first fluid is attained by the action of a reforming catalyst 42 being impregnated in a section of the first fluid flow path (in the inner ring-shaped space 32 between the inner tube 23 and the middle tube 24, in this instance) in a way in which it closes the flow path.

A high-temperature combustion gas is sent as the second fluid in the axial space 35 of the inner tube 23 for the purpose of providing the reforming catalyst 42 with a reaction heat.

The second fluid fed by a combustion vessel (not shown) being disposed in the bottom space 34 is sent out of the bottom space 34 to the axial space 35 via the central opening 30H and is discharged out of the reformer 20 via a second fluid discharge pipe 43 united (seam C1) with the end plate 25 closing the upper open end of the axial space 35.

The second fluid discharge pipe 43 is a tubular member like the first fluid introducing pipe 40 and the first fluid discharge pipe 41, and it must be united (seams C1, C2 and C3) gas-tight with the end plates 25, 26 and 27 appropriately as plate members.

Further, the end plate 22 is also a plate member formed in ring as a partition plate dividing the first fluid flow paths (32 and 33) and the second fluid flow paths (34 and 35), and so the plate must be united (seam C4) gas-tight similarly with the cylindrical rim at the lower end of each of the inner tube 23 and the outer tube 21.

The seams C1, C2, C3 and C4 uniting the tubular members 43, 40, 41, 23 and 21 with the plate members (hereinafter, the "Type C seam") have a seam structure substantially the same as that of the seams A1 and A2 (Type A seam) in the triplicate tube and the seam B (Type B seam).

Figure 4:
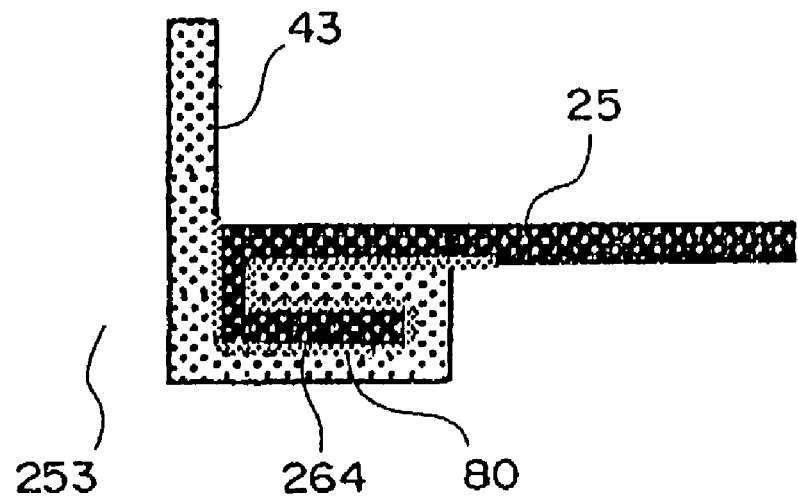
FIG. 4 is an enlarged sectional view of Type C seam.

Type C seam according to the invention is described taking the seam C1 in FIG. 4 as an example. FIG. 4 is a sectional view of the seam (Type C seam) uniting the cylindrical end at the lower end of the second fluid discharge pipe 43 as a tubular member with a connecting hole 253 formed in the center of the end plate 25.

In the Figure, Type C seam, the seam C1, is formed by first forming in advance the outer abutting rim 264 abutting as an abutting rim to abut on the outer surrounding surface of the cylindrical end at the lower section of the second fluid discharge pipe 43 being inserted in the connecting hole 253 formed in the end plate 25, subsequently folding the cylindrical end of the second fluid discharge pipe 43 with the outer abutting rim 264 to the outside of the second fluid discharge pipe 43 in a duplicate overlapped state and lastly applying the rolling-compacting process.

In the process, the tip of the cylindrical end of the second fluid discharge pipe 43 is first stretched out far beyond the tip of the outer abutting rim 264 so that the tip of the cylindrical end covers the surface of the seam C1 and then is folded. Further, Type C seam has a folded structure that is substantially the same as that of Types A and B seams as revealed by such works as the insertion of the sealing member 80 in the region where the cylindrical end of the second fluid discharge pipe 43 and the outer abutting rim 264 are overlapped.

Figure 5:
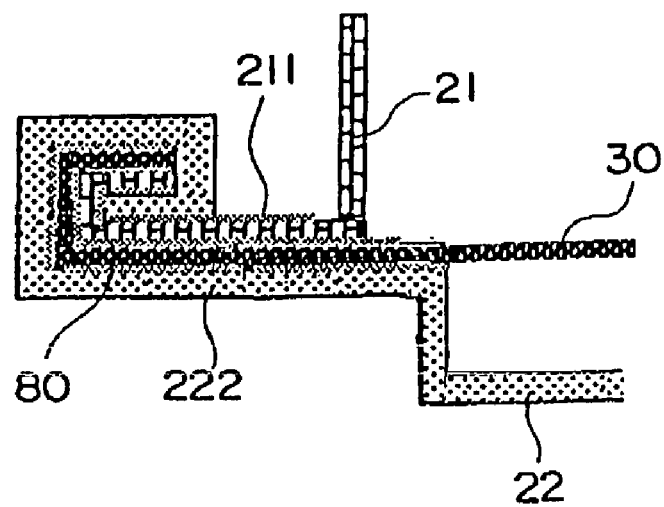
FIG. 5 is an enlarged sectional view of Type D seam.

In Embodiment 1, a seam D uniting the outer cylindrical casing (the outer tube) 21 forming the outer vessel of the reformer 20 with the end plate 22 forming the bottom thereof has a seam structure substantially the same as that of the Type A seam. This is described in the following while referring to FIG. 5.

In the Figure, the seam is formed by abutting the cylindrical end of the outer tube 21 on the outer surrounding edge of the ring-shaped end plate 30 as the one abutting edge 211 and then placing the end plate 22 under the outer surrounding edge in a way in which the outer surrounding edge thereof abuts as the other abutting edge 222 to sandwich the outer surrounding edge (corresponding to the cylindrical end of the tubular member in Type A seam structure) of the end plate 30, subsequently folding them upward in a triplicate overlapped state and finally uniting them by the rolling-compacting process (hereinafter, the "Type D seam).

In the process, the cylindrical end of the outer cylindrical casing (the outer tube) 21 as a tubular member has been folded in the form of a flange in advance to the outside of the tubular member, and the outer surrounding edges of both the ring-shaped end plate 30 and the end plate 22 as a plate member are laid over the cylindrical end so that the open end of the outer cylindrical casing 21 is covered. Unlike Types A, B and C seams, the outer surrounding edge of the end plate 22 which is rather flat is not folded as it is but is laid over as the abutting edge before being folded in Type D seam. The end plate 22 and the edge covering extended section formed in the outer surrounding edge thereof come on the surface of the folded seam C1.

Incidentally, although the seam C1 is of a triplicate structure as the ring-shaped end plate 30 is interposed as a third plate member, the seam is substantially the same as the Type A seam shown in FIG. 2, if the members that are actually overlapped are not taken into account, and in fact the seam C1 has a folded structure similar to that of the Type B seam shown in FIG. 3 and the Type C seam shown in FIG. 4, if the end plate 30 is not present.

In Embodiment 1, when forming seams by rolling-compacting with the sealing member 80 inserted, the cylindrical end of each tubular member is folded at a time throughout the entire distance thereof before being united by the process.

Figure 9:
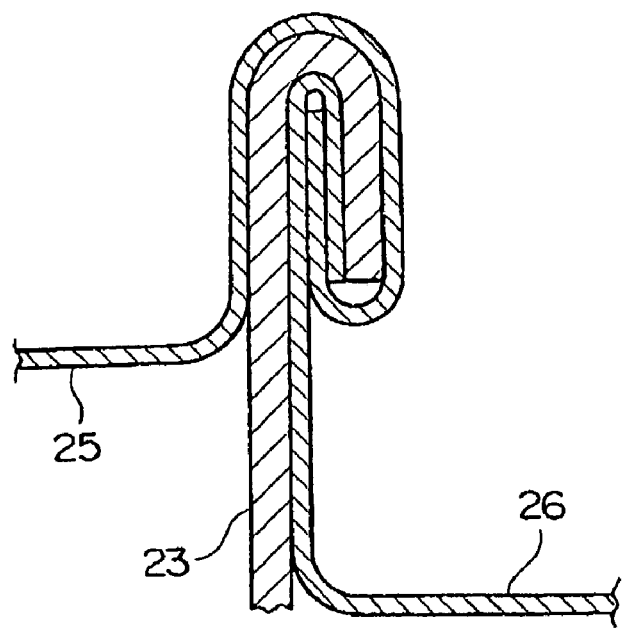
FIG. 9 is a partial sectional view of Type A seam showing an actual state thereof.
Figure 10:
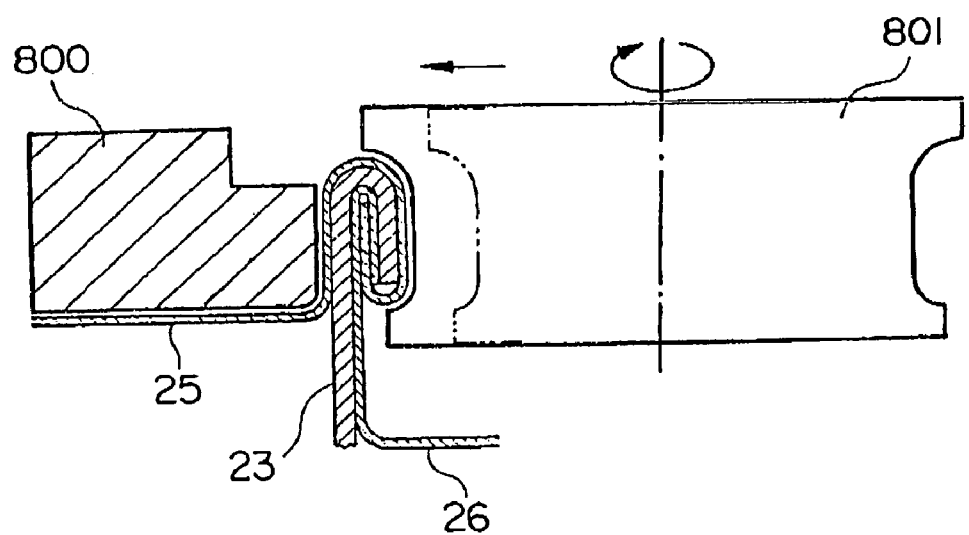
FIG. 10 is an explanatory drawing showing the processing of Type A seam.
Figure 11:
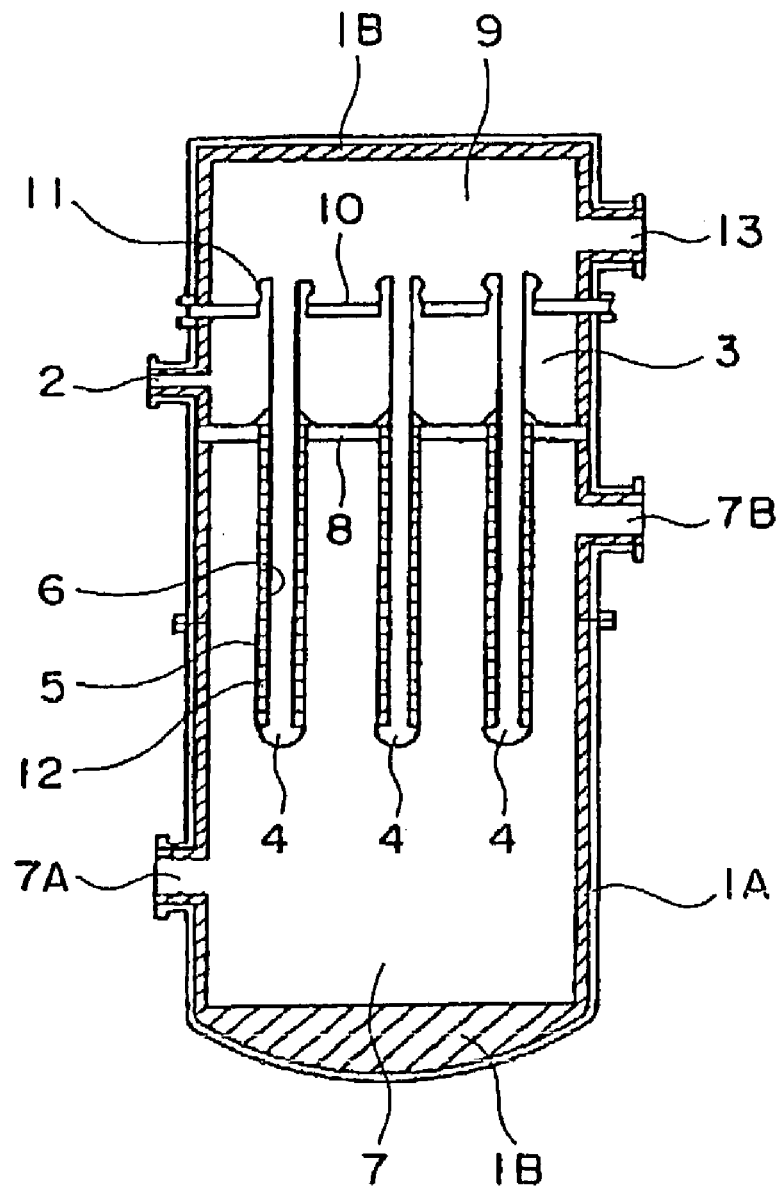
FIG. 11 is a longitudinal sectional view of a conventional reformer for fuel cells.

Incidentally, although each of the seams is illustrated as being folded in rectangular in the sectional views shown in FIGS. 2–5, each corner is rounded in actual, as shown in FIG. 9. FIG. 9 shows a sectional view of a Type A seam, which is formed as shown in FIG. 10 by rolling and compacting the sections to be united, while pressing the sections with a chuck 800 and a roller 801, into a seam having a cross section that suits the concave of a roller 801 through the rotational movement of the roller 801 along the surface of the fixed chuck 800.

The operation of the reformer 20 of the invention is briefly described in the following.

In FIG. 1, the material fluid, the first fluid, at temperatures below 200° C. is introduced into the first fluid flow paths (32, 31 and 33) via the first fluid feeding pipe 40. The first fluid is then sent into the ring-shaped space 32 filled with the reforming catalyst 42 heated up to ca.600–700° C., where it is heated to a temperature almost the same as that of the reforming catalyst 42, and is shifted to a reformed gas. The reformed gas exchanges heat with the first fluid in the upper ring-shaped space 32 in the ring-shaped space 33 between the outer tube 21 and the middle tube 24, thus being cooled down to below ca. 200° C., and is introduced to the first fluid discharge pipe 41.

In the process, the areas adjacent to the seams A, A2, B, C, C2 and C3 being formed with rolling-compacting are not exposed to heat over 200° C., and so it is possible for the seams formed with the insertion of the sealing member 80 of organic materials to maintain their original sealing property because the sealing member is not carbonized, while having improved sealing property due to the use of the sealing member.

While, the second fluid which is heated to 700° C. or above in the second fluid feeding vessel, a combustion vessel (not shown), for instance, is sent out of the bottom space 34 into the second fluid flow path, or the axial space 35 of the inner tube 23, via the communicating hole 30H, then exchanges heat with the first fluid at the inner surface of the inner tube 23 while passing through the tube to be cooled down to below 200° C., and is finally discharged out of the reformer 20 from the second fluid discharge pipe 43. Although the areas adjacent to the seam C4 could be exposed to high temperatures as high as over 700° C., the seam can maintain an excellent gas sealing property even exposed to high temperatures over 700° C. if a metallic brazing material is inserted as the sealing member 80.

In the case of seams formed with the rolling-compacting process including Types A, B, C and D seams represented in the Figure by the seams A1 and A2, the seam B, the seams C1, C2, C3 and C4, and the seam D, respectively, a pressure resistance, sealing property, of about 10 kgf/cm$^2$ is generally attainable by the use of the caulking, rolling-compacting or curling process together with the insertion of the sealing member 80. It is therefore possible to attain a sufficient gas sealing even in reformers of the pressure type, not to speak of reformers of the atmospheric type.

Although in Embodiment 1, seam formation is performed at each seam using the rolling-compacting process, caulking or curling will have a similar effect, and it is possible to improve manufacturing efficiency if a right method selected out of these three methods depending on the situation of each seam is used. It is not necessary to apply these processes to all seams, however; use only for the seams requiring application of one of these processes.

Embodiment 2

Figure 6:
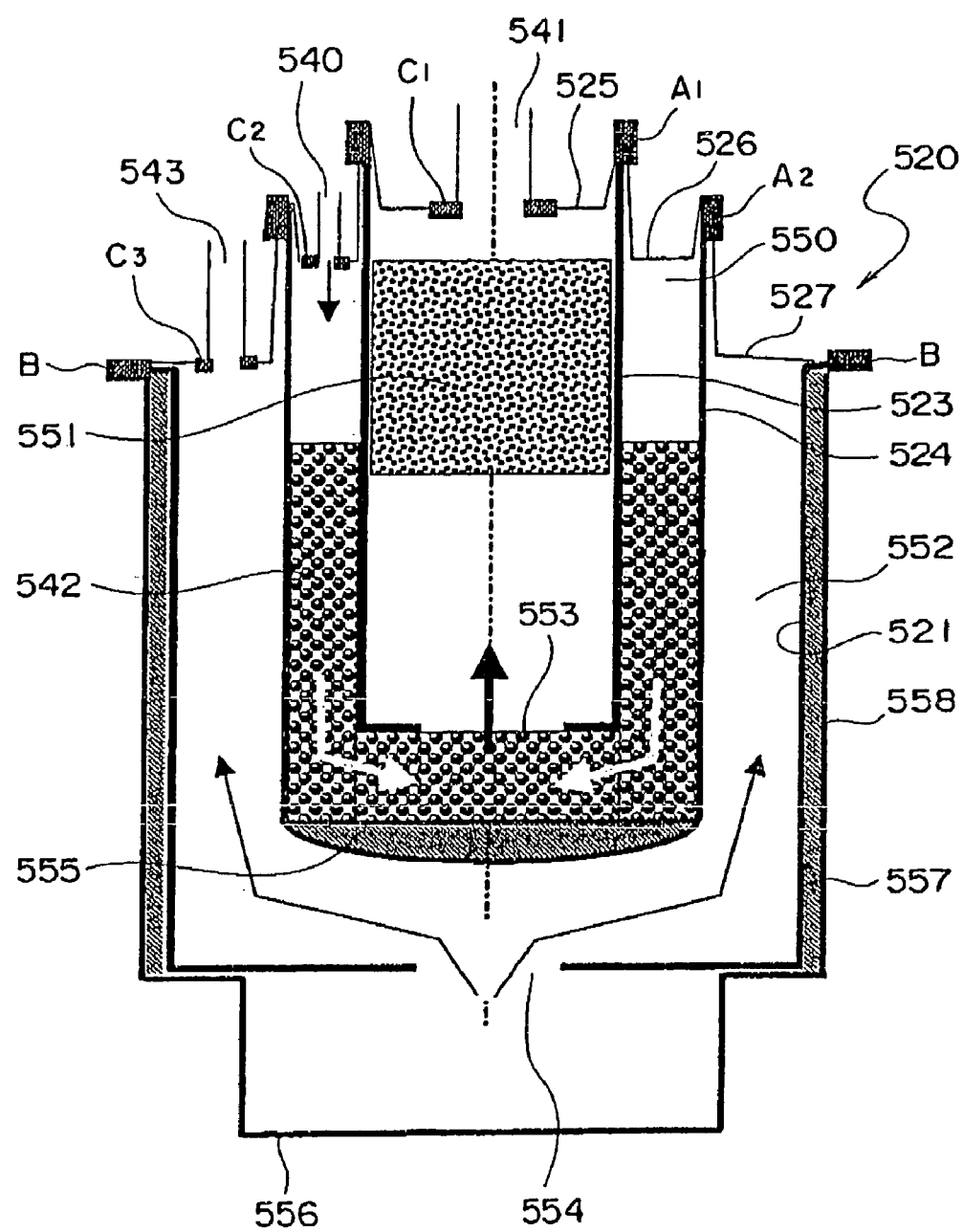
FIG. 6 is a longitudinal sectional view of a reformer of Embodiment 2 of the present invention.

A reformer of the external flame type of the invention is described in the following while referring to FIG. 6. FIG. 6 is a longitudinal sectional view of the reformer of the external flame type.

In FIG. 6, 521 is an outer tube of a reformer 520, or an outer cylindrical casing composing an outer vessel of the reformer 520. An inner tube 523 and a middle tube 524 are disposed within the outer tube 521 coaxially so that they form a triplicate tube altogether.

A ring-shaped space through which a fluid passes is formed in the space between the inner tube 523 and the middle tube 524 and that between the middle tube 524 and the outer tube 521. The space between the inner tube 523 and the middle tube 524 serves as a first fluid flow path 550, which contains in a section thereof a reforming catalyst 542 and a CO shift reacting catalyst 551. The space between the middle tube 524 and the outer tube 521 serves as a second fluid flow path 552.

Each of the tubular members, the inner tube 523, the middle tube 524 and the outer tube 521, is formed into a bottomed cylinder having a bottom cover formulated by the choking process, for instance, and both the inner tube 523 and the outer tube 521 are provided with a communicating hole for gas flow at the bottom, a communicating hole 553 and 554, respectively. The middle tube 24 is provided with a heat-resistant cover 555 at the outside of the lower end thereof.

A second fluid feeding vessel 556 for feeding a high-temperature combustion gas through the communicating hole 554 is disposed under the outer tube 521. The surrounding wall of the second fluid feeding vessel 556 extends as far as the upper end of the outer tube 521 so that it encloses the tube 521, thus forming a covering tube 558 outside the outer tube 521 with an incinerator 557 being inserted in the space between the covering tube 558 and the outer tube 521.

An inner end plate 525 is united (seam A1) with the inner tube 523 at the upper open end thereof, an inner ring-shaped end plate 526 is united (seam A2) with the middle tube 524 at the upper open end facing the ring-shaped space between the inner tube 523 and the middle tube 524, and an outer ring-shaped end plate 527 is united (seam B) with the outer tube 521 at the upper open end facing the ring-shaped space between the middle tube 524 and the outer tube 521.

Further, a first fluid discharge pipe 541 is united (seam C1) with the inner end plate 525, a first fluid feeding pipe 540 is united (seam C2) with the inner ring-shaped end plate 526, and a second fluid discharge pipe 543 is united (seam C3) with the outer ring-shaped end plate 527.

The seams A1 and A2 in the above are Type A seams shown in FIG. 2, the seam B, Type B seam shown in FIG. 3 and the seams C1, C2 and C3, Type C seams shown in FIG. 4.

The operation of the reformer of this Embodiment is briefly described in the following.

The material fluid, the first fluid, at temperatures below 200° C. is introduced into the first fluid flow path 550 via the first fluid feeding pipe 540. The first fluid is sent into a fluid flow path being filled with the reforming catalyst 542 heated up to ca.600–700° C., where it is heated to a temperature almost same as that of the reforming catalyst 542 and is shifted to a reformed gas. While passing through the inner tube 523, the reformed gas exchanges heat on the inner and outer surfaces of the tube and is also subjected to a shift reaction with the CO shift catalyst 551, and then cooled down to below ca. 200° C. during which the CO content is reduced, and finally it is introduced to the first fluid discharge pipe 541.

The second fluid is heated in the second fluid feeding vessel 556 a combustion vessel (not shown), for instance to 700° C. or above, is sent from the communicating hole 554 as the second fluid inlet into the second fluid flow path 552, or the ring-shaped space between the middle tube 524 and the outer tube 521, exchanges heat with the first fluid at the surface of the middle tube 524, then is cooled down to below 200° C., and finally discharged out of the reformer 520 via the second fluid discharge pipe 543.

Because the seams A1, A2, C1, C2 and C3 in the reformer 520 are not exposed to high temperatures (up to ca. 200° C.), it is possible to improve the gas-sealing property of these seams by inserting organic gas-sealing materials, the gas sealing member 80, for instance, in the sections where the cylindrical edges of tubular members are laid over the abutting edges of plate members, and then forming seams with the rolling-compacting process as described for Embodiment 1. Because the sealing member 80 is not carbonized in the process, the seams maintain their sealing property for a long time.

The sealing member 80 may be made from brazing materials instead of organic sealing materials.

Further, although examples of seams uniting tubular members directly with plate members In Embodiments 1 and 2 of the invention is described, seams may be formed by placing joining members such as bellows between tubular and plate members (not shown). In such cases, the type of seams uniting bellows with tubular members or with plate members (not shown) may be selected appropriately out of Types A, B, C and D depending on the situation of the sections to be united.

Embodiment 3

Figure 7:
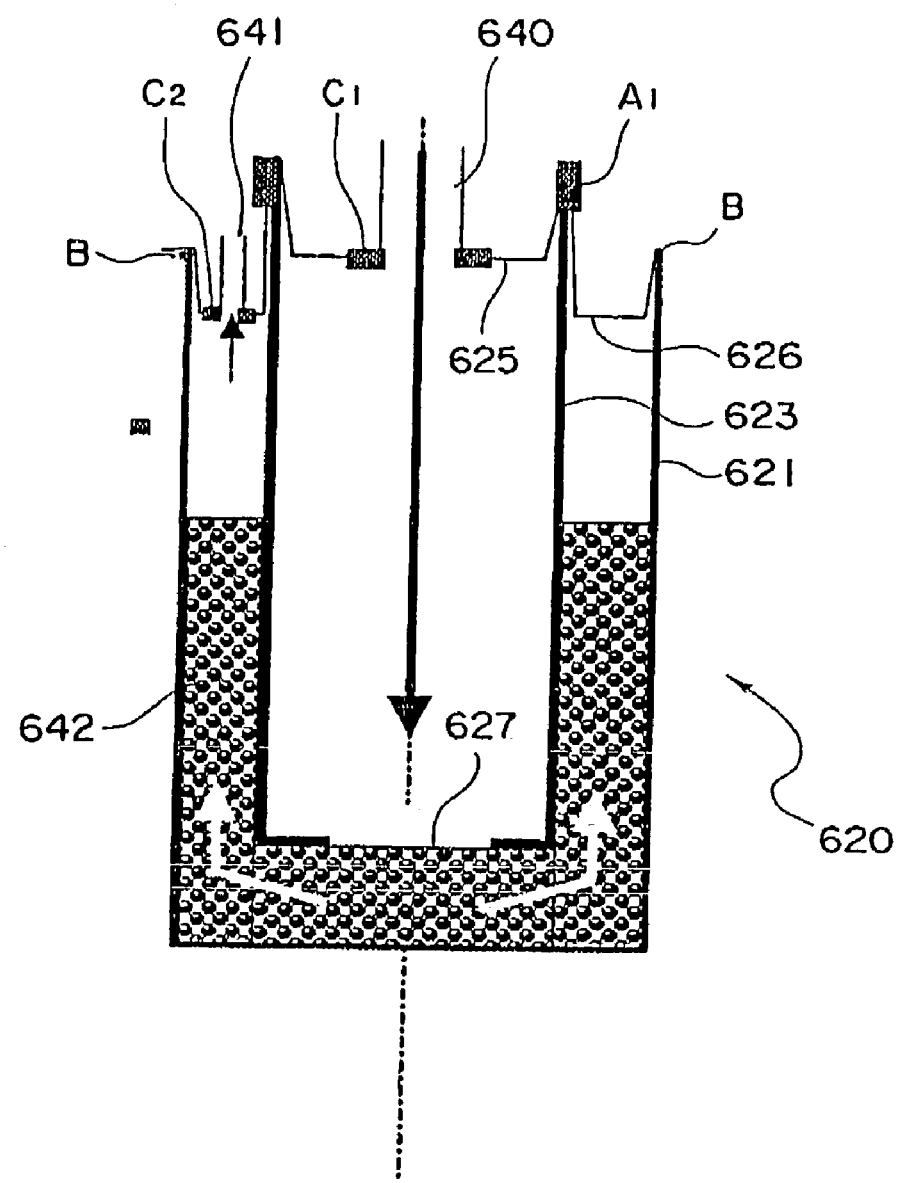
FIG. 7 is a longitudinal sectional view of a CO reducer of Embodiment 3 of the present invention.

A CO reducer, as a reformer in a broad sense, is now described taking a CO reducer of the self-heat exchange type reducing CO by oxidation reaction as an example, while referring to FIG. 7. FIG. 7 is a longitudinal sectional view of the CO reducer.

In FIG. 7, a CO reducer 620 is of a duplicate-tube structure composed of an outer tube 621 as a bottomed cylindrical tubular member forming the outer vessel of the CO reducer 620 and an inner tube 623 as a bottomed cylindrical tubular member being disposed coaxially within the outer tube 621, and a communicating hole 627 is formed at the bottom of the inner tube 623.

An end plate 625, as a plate member with which a first gas feeding pipe 640 is united (seam C1), is united (seam A1)

with the inner tube 623 at the upper open end thereof so that the plate member closes the open end.

A ring-shaped end plate 626, as a plate member with which a first gas discharge pipe 641 is united (seam C2), is united (seam A2) with the outer tube 621 at the upper open end of a ring-shaped space as a first gas flow path formed between the inner tube 623 and the outer tube 621 so that the plate member closes the open end.

In the CO reducer 620, the seam A1 shown in the Figure is a Type A seam shown in FIG. 2, the seam B, Type B seam shown in FIG. 3 and the seams C1 and C2, Type C seams shown in FIG. 4.

The operation of the CO reducer in this Embodiment is briefly described in the following.

The reformed gas, as a first gas in which the CO content is reduced to about 1% following reformation and shift reactions, is mixed with air for oxidation in the upstream section (not shown) and introduced from a first gas feeding pipe 640 into a first gas flow path, where its CO content is reduced to approximately 50–60 ppm by a CO oxidation catalyst 642. The CO oxidation reaction is an exothermic reaction, and the heat generated as a result of the reaction is exchanged with the reformed gas before being subjected to the reaction via the inner tube 623 as well as released from the outer tube 621.

Embodiment 4

Figure 8:
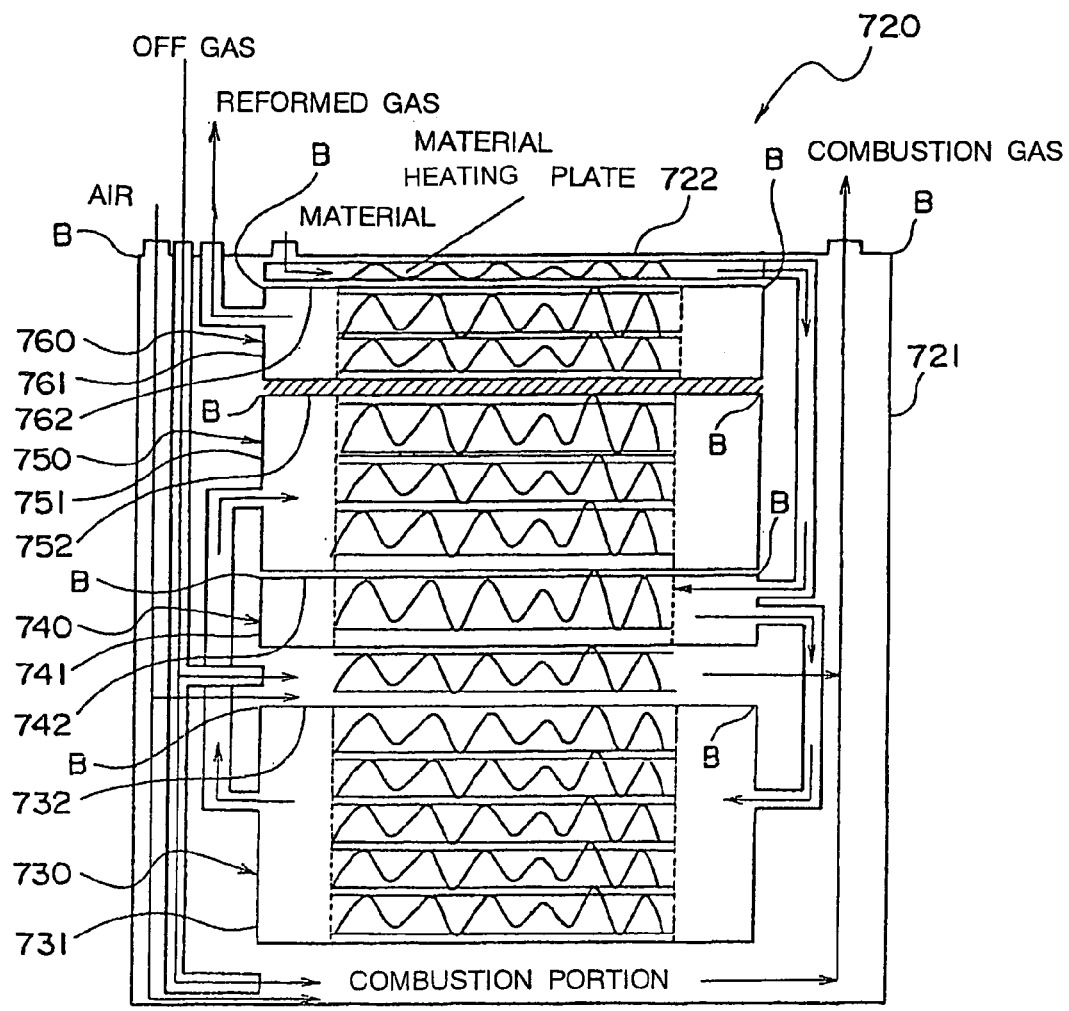
FIG. 8 is a longitudinal sectional view of a CO laminar-type reformer of Embodiment 4 of the present invention.

Seams uniting an outer cylindrical casing as a tubular member composing the outer vessel of a reformer with end plate or plates (covering) as a plate member (members) closing one or both of the open ends of the cylindrical casing, and seams uniting the outer cylindrical casing as a tubular member comprising various inner vessels disposed within the outer vessel with end plate or plates (covering) as a plate member (members) closing one or both of the open ends of the cylindrical casing in Embodiment 4 of the invention is described taking a laminar type reformer as an example, while referring to FIG. 8. FIG. 8 is a longitudinal sectional view of the laminate type reformer.

In a reformer 720 shown in FIG. 8, the outer vessel is composed of a bottomed outer cylindrical casing 721 and an end plate 722 as the covering closing the upper open end of the outer cylindrical casing 721 that is united with the casing through a seam (seam B).

Within the outer vessel, such inner vessels as a reformer vessel 730 containing a reforming catalyst, a heater vessel 740 containing a material heating section, a first reducer vessel 750 containing a first CO reducer for reducing the CO content of the reformed gas after reforming, and a second reducer vessel 760 containing a second CO reducer are stacked up. Each of these inner vessels 730, 740, 750 and 760 are linked appropriately via necessary fluid flow paths.

These inner vessels 730, 740, 750 and 760 are, like the outer vessel 721, composed by bottomed outer cylindrical casings 731, 741, 751 and 761 and end plates 732, 742, 752 and 762 as their respective coverings through seams B.

The seams B in FIG. 8 is Type B seam described in Embodiment 1. The seam structure is not limited to this, however, and other structures described in Embodiment 1 may be acceptable. This seam structure allows this Embodiment to exert a similar effect shown by Embodiment 1.

Further, it is possible to provide a good sealing property to conventional laminar type reformers in which inter-laminar sealing was made including the one described in the Proceedings of the Third International Fuel Cell Conference as mentioned in the Related Art section above if various vessels are put in groups in boxy vessels as shown in FIG. 8 and the boxy vessels are united as done in this embodiment.

Incidentally, tubular members of Embodiments 1–4 are not necessarily limited to round tubes; they may be square tubes with round corners, and such members are not limited to the so-called tubes composing fluid flow paths but include bottomed cylindrical members (outer cylindrical members) such as those having a round section or a square section with round corners, for instance, composing an outer vessel of a reformer and a container of inner vessels disposed within a reformer.

As has been described, the reformer according to the invention includes: a housing including a tubular member and an end plate member hermetically joined to the tubular member, the housing defining therein a first fluid flow path and a second fluid flow path in a heat exchanging relationship, and a reforming catalyst disposed within the first fluid flow path, the tubular member having a tubular end and the end plate member having an abutting rim that contacts with and extends along the tubular end of the tubular member and that is folded together over an entire circumference thereof to define a folded hermetic seam between the tubular member and the end plate member.

Different from seams formed with welding in which the sections to be united are exposed to high temperatures during welding, they are not exposed to high temperatures according to the invention, thus solving the problem of strain due to heat, and it is possible to improve the precision of fabrication and attain an automatic seam formation or a mass formation by using a general apparatus for rolling-compacting, caulking or curling. Thus, it is possible to provide low-priced reformers.

Further, since it is possible, according to the invention, to reduce a mutual interference among work jigs in conducting the uniting work by shifting the positions of seams axially in individual tubes in a multiple tube, the uniting work can be performed efficiently.

Further, it is possible, according to the invention, to improve the gas sealing property of seams through the interposing of a sealing member.

Further, the use of a brazing material as a sealing member according to the invention results in improved thermal resistance, a use extension (because such a material can be used in forming seams exposed to high temperatures), longer sealing property in situations exposed to high temperatures and higher gas-sealing property.

Further, it is possible, according to the invention, to improve the reliability of the seams if spot welding is applied to appropriate seams.

What is claimed is:

1. A reformer comprising:
    first and second tubular members, each of the first and second tubular members including respective first and second tubular ends, the first and second tubular members being disposed coaxially along an axis;
    a first annular plate member including an external rim disposed within and hermetically sealed to the first tubular end of the first tubular member at the external rim by a first folded seam;
    a second annular plate member including an external rim and an internal rim, disposed between and hermetically sealed to the first tubular ends of the first and second tubular members at the internal and external rims, respectively, by second and third folded seams, respectively, wherein the first tubular ends of the first and second tubular members are located at axially different positions with the first tubular end of the first tubular member projecting relative to the first tubular end of the second tubular member; and
a catalyst disposed between the first and second tubular members.

2. The reformer according to claim 1 wherein the first and second annular plate members each include an opening for passage of a fluid through the first and second annular plate members, respectively.

3. The reformer according to claim 2 further comprising first and second pipes disposed within the openings in the first and second annular plate members, respectively, and hermetically sealed to the first and second annular plate members at the openings, respectively, by fourth and fifth folded seams, respectively.

4. The reformer according to claim 1 wherein the second tubular end of the second tubular member is closed.

5. A reformer comprising:
first and second tubular members, each of the first and second tubular members including respective first and second tubular ends, the first and second tubular members being disposed coaxially along an axis;
a first annular plate member including an external rim disposed within and hermetically sealed to the first tubular end of the first tubular member at the external rim by a first folded seam;
a second annular plate member including an external rim and an internal rim, disposed between and hermetically sealed to the first tubular ends of the first and second tubular members at the internal and external rims, respectively, by second and third folded seams, respectively, wherein the first tubular ends of the first and second tubular members are located at axially different positions with the first tubular end of the first tubular member projecting relative to the first tubular end of the second tubular member;
a third tubular member, including first and second tubular ends, disposed coaxially, along the axis, with the first and second tubular members;
a third annular plate member including an external rim and an internal rim, disposed between and hermetically sealed to the first tubular ends of the second and third tubular members at the internal and external rims, respectively, by fourth and fifth folded seams, respectively, wherein the first tubular end of the third tubular member is located at an axially different position from the first tubular ends of the first and second tubular members with the first tubular end of the second tubular member projecting relative to the first tubular end of the third tubular member; and
a fourth annular plate member having an external rim and an internal rim, disposed at and hermetically sealed to the second tubular ends of the first and third tubular members at the internal and external rims, respectively, by sixth and seventh folded seams, respectively.

6. The reformer according to claim 5 wherein the first, second, and third annular plate members each include an opening for passage of a fluid through the first, second, and third annular plate members, respectively.

7. The reformer according to claim 6 further comprising first, second, and third pipes disposed within the openings in the first, second, and third annular plate members, respectively, and hermetically sealed to the first, second, and third annular plate members, respectively, by sixth, seventh, and eighth folded seams, respectively.

8. The reformer according to claim 5 further comprising a catalyst disposed between the first and second tubular members.

9. A reformer comprising:
first and second tubular members, each of the first and second tubular members including respective first and second tubular ends, the first and second tubular members being disposed coaxially along an axis, wherein the second tubular end of the second tubular member is closed;
a first annular plate member including an external rim disposed within and hermetically sealed to the first tubular end of the first tubular member at the external rim by a first folded seam;
a second annular plate member including an external rim and an internal rim, disposed between and hermetically sealed to the first tubular ends of the first and second tubular members at the internal and external rims, respectively, by second and third folded seams, respectively, wherein the first tubular ends of the first and second tubular members are located at axially different positions with the first tubular end of the first tubular member projecting relative to the first tubular end of the second tubular member;
a third tubular member, including first and second tubular ends, disposed coaxially, along the axis, with the first and second tubular members;
a third annular plate member including an external rim and an internal rim, disposed between and hermetically sealed to the first tubular ends of the second and third tubular members at the internal and external rims, respectively, by fourth and fifth folded seams, respectively, wherein the first tubular end of the third tubular member is located at an axially different position from the first tubular ends of the first and second tubular members with the first tubular end of the second tubular member projecting relative to the first tubular end of the third tubular member; and
a catalyst disposed between the first and second tubular members.

10. The reformer according to claim 9 wherein the first, second, and third annular plate members each include an opening for passage of a fluid through the first, second, and third annular plate members, respectively.

11. The reformer according to claim 10 further comprising first, second, and third pipes disposed within the openings in the first, second, and third annular plate members, respectively, and hermetically sealed to the first, second, and third annular plate members, respectively, by sixth, seventh, and eighth folded seams, respectively.

12. The reformer according to claim 1 further comprising a sealing member positioned within at least one of the first, second, and third folded seams.

13. The reformer according to claim 12 wherein the sealing member comprises a thin film of an organic material or a paste of an organic or inorganic material.

14. The reformer according to claim 12 wherein the sealing member comprises a thin film or a paste of a brazing material.

15. The reformer according to claim 1 wherein at least one of the first, second, and third folded seams is welded.

16. The reformer according to claim 9 wherein the second tubular end of the third tubular member is partially closed and spaced from the second tubular end of the second tubular member.

* * * * *